(12) United States Patent
Zhao et al.

(10) Patent No.: US 11,479,495 B2
(45) Date of Patent: Oct. 25, 2022

(54) ACTUATING MECHANISM CONTROL METHOD FOR GLASS PLATE TEMPERING PROCESS

(71) Applicant: LUOYANG LANDGLASS TECHNOLOGY CO., LTD., Luoyang (CN)

(72) Inventors: Yan Zhao, Luoyang (CN); Gaofeng Dou, Luoyang (CN); Chunwei Jiang, Luoyang (CN)

(73) Assignee: Luoyang Landglass Technology Co., Ltd., Luoyang (CN)

( * ) Notice: Subject to any disclaimer, the term of this patent is extended or adjusted under 35 U.S.C. 154(b) by 316 days.

(21) Appl. No.: 16/636,644

(22) PCT Filed: Apr. 11, 2018

(86) PCT No.: PCT/CN2018/082666
§ 371 (c)(1),
(2) Date: Feb. 5, 2020

(87) PCT Pub. No.: WO2019/029179
PCT Pub. Date: Feb. 14, 2019

(65) Prior Publication Data
US 2021/0147278 A1 May 20, 2021

(30) Foreign Application Priority Data

Aug. 7, 2017 (CN) .......................... 201710666798.7

(51) Int. Cl.
*C03B 27/04* (2006.01)
*C03B 29/08* (2006.01)
(Continued)

(52) U.S. Cl.
CPC .......... *C03B 27/0417* (2013.01); *C03B 25/00* (2013.01); *C03B 29/08* (2013.01); *G05B 19/045* (2013.01)

(58) Field of Classification Search
CPC .... C03B 27/012; C03B 27/0417; C03B 27/04
See application file for complete search history.

(56) References Cited

U.S. PATENT DOCUMENTS 3,902,884 A * 9/1975 Harrison ............... C03B 27/022
65/161
5,194,083 A * 3/1993 Lehto .................... C03B 29/025
65/273
(Continued)

FOREIGN PATENT DOCUMENTS

CN 1759071 A 4/2006
CN 102344242 A 2/2012
(Continued)

OTHER PUBLICATIONS

International Search Report (with partial translation) and Written Opinion dated Jun. 19, 2018, issued in corresponding International Patent Application No. PCT/CN2018/082666.

*Primary Examiner* — Alison L Hindenlang
*Assistant Examiner* — Steven S Lee
(74) *Attorney, Agent, or Firm* — Morgan, Lewis & Bockius LLP

(57) ABSTRACT

An actuating mechanism control method for a glass plate tempering process, comprising: after a glass plate is conveyed into a heating furnace, a monitoring unit monitors in real time energy consumed by a heating element of the heating furnace, and sends the energy consumed to a control unit to compare with a set threshold; and when the energy consumed by the heating element of the heating furnace is greater than or equal to the set threshold, the control unit sends an instruction to an actuating mechanism to control (Continued)

actions of the actuating mechanism to complete a corresponding tempering process procedure. Through the method that the monitoring unit monitors in real time the energy consumed by the heating element of the heating furnace, a heating procedure of the glass plate is more scientifically and precisely controlled, and, therefore, a discharging moment of the glass plate can be accurately determined.

7 Claims, 1 Drawing Sheet

(51) Int. Cl.
  *G05B 19/045* (2006.01)
  *C03B 25/00* (2006.01)

(56) References Cited

U.S. PATENT DOCUMENTS

| | | | | |
|---|---|---|---|---|
| 5,236,488 A | * | 8/1993 | Vehmas | C03B 27/044 |
| | | | | 65/351 |
| 5,620,492 A | * | 4/1997 | Land | C03B 27/044 |
| | | | | 65/351 |
| 7,414,223 B2 | * | 8/2008 | Janhunen | C03B 27/0417 |
| | | | | 219/400 |
| 9,296,638 B2 | * | 3/2016 | Lezzi | B60J 1/001 |
| 2007/0169513 A1 | * | 7/2007 | Zhao | C03B 29/025 |
| | | | | 65/162 |
| 2009/0199594 A1 | * | 8/2009 | Abbott | C03B 35/14 |
| | | | | 65/161 |
| 2017/0066678 A1 | * | 3/2017 | Zhao | C03B 27/0417 |
| 2020/0165154 A1 | * | 5/2020 | Zhao | G05D 23/30 |

FOREIGN PATENT DOCUMENTS

| | | | | | |
|---|---|---|---|---|---|
| CN | 102344242 A | * | 2/2012 | | |
| CN | 202148251 U | * | 2/2012 | | |
| CN | 102730952 A | * | 10/2012 | | |
| CN | 203715692 U | * | 7/2014 | | |
| CN | 104773949 A | | 7/2015 | | |
| CN | 104773949 A | * | 7/2015 | | |
| CN | 104817261 A | * | 8/2015 | | |
| CN | 104891796 A | * | 9/2015 | | |
| CN | 105084732 A | * | 11/2015 | | |
| CN | 105910648 A | * | 8/2016 | | |
| CN | 106066627 A | * | 11/2016 | | |
| CN | 107382045 A | | 11/2017 | | |
| JP | S5879834 A | * | 3/1983 | | C07C 303/32 |
| WO | WO-2015172723 A1 | * | 11/2015 | | C03B 27/0417 |

* cited by examiner

ACTUATING MECHANISM CONTROL METHOD FOR GLASS PLATE TEMPERING PROCESS

CROSS-REFERENCED APPLICATIONS

This application is a U.S. national phase entry under 35 U.S.C. § 371 from PCT International Application No. PCT/CN2018/082666 filed on Apr. 11, 2018, which is based upon and claims the benefit of priority from the prior Chinese Patent Application No. 201710666798.7 filed on Aug. 7, 2017. The entire contents of the above applications are incorporated herein by reference.

TECHNICAL FIELD

The present disclosure relates to a glass production process, and in particular, to an actuating mechanism control method for a glass plate tempering process.

BACKGROUND TECHNOLOGY

In a glass plate tempering process, a glass plate is firstly heated to a softening temperature (for example, 600° C. to 700° C.), and then tempering treatment is completed by rapid cooling. Glass plate heating is an important process control procedure. In the prior art, a glass plate heating procedure is controlled by a heating time, that is, the glass plate heating time is estimated according to thickness of the glass plate multiplied by a time coefficient. When a set heating time is reached, the glass plate is discharged. The manner of controlling the glass plate heating procedure based on experience has the following technical defects: 1. The glass plate heating temperature is difficult to be precisely controlled, and insufficient heating temperature or over-sintering of the glass plate usually occurs, which directly imposes adverse effects on the tempered quality of the glass plate, for example, a tempering stress may be substandard, and the flatness of the glass plate may be unqualified; 2. If the heating time is too long, a waste of energy may be caused to increase production costs; and 3. Over-reliance on experience and quality of an operator not only increases labor costs, but also has adverse effects on the improvement of the product qualification rate and the long-term stability of quality.

In the glass plate tempering process, after heated to a softening temperature (for example, 600° C. to 700° C.) in the heating furnace, the glass plate needs to be quickly discharged to enter a tempering stage, wherein the tempering treatment is completed by using a fan to blow to rapidly cool the glass plate. To achieve rapid cooling of the glass plate, before the glass plate is discharged, the fan needs to reach a certain rotational speed in advance and generate a sufficient wind pressure. In the prior art, a common method is to switch on the fan or control the fan to be changed from an idle state to an active state in advance according to the remaining heating time in the glass plate heating procedure. This control method has the following disadvantages: Firstly, the glass plate heating time is estimated according to the thickness of the glass plate multiplied by the time coefficient. The heating time calculated based on experience is very imprecise, which extremely easily causes the fan to be switched on too early or too late. When the fan is switched on too early, a lot of energy is wasted, and the production costs are increased. When the fan is switched on too late, the wind pressure cannot reach a required value during tempering, which may cause an insufficient tempering stress of the finished glass products, and the products are directly scrapped. Secondly, the control procedure overly relies on experience and quality of an operator, which not only increases labor costs, but also has adverse effects on the improvement of the product qualification rate and the long-term stability of product quality.

SUMMARY

An objective of the present disclosure is to provide an actuating mechanism control method for a glass plate tempering process to resolve the problems that, in the prior art, action execution in tempering process procedures of a heating furnace is determined in a time-based estimation manner, and an error is easily caused by directly detecting an internal temperature of the heating furnace.

To resolve the foregoing technical problems, the technical solution adopted in the present disclosure is: the actuating mechanism control method for a glass plate tempering process, where after a glass plate is conveyed into a heating furnace, a monitoring unit monitors in real time energy consumed by a heating element of the heating furnace, and sends the energy consumed to a control unit to compare with a set threshold; and when the energy consumed by the heating element of the heating furnace is greater than or equal to the set threshold, the control unit sends an instruction to an actuating mechanism to control actions of the actuating mechanism to complete a corresponding tempering process procedure.

The control unit is a Programmable Logic Controller ("PLC" or a Personal Computer ("PC").

The actuating mechanism is a driving mechanism for controlling a glass plate discharge action; after the glass plate is conveyed into the heating furnace, the monitoring unit monitors in real time the energy consumed by the heating element of the heating furnace, and sends the energy consumed to the control unit to compare with a set threshold $Q_1$, and when the energy consumed by the heating element of the heating furnace is greater than or equal to the threshold $Q_1$, the control unit sends an instruction to the driving mechanism to directly discharge the glass plate from the heating furnace or to discharge the glass plate from the heating furnace after a delay.

The threshold $Q_1 = K_1 \cdot q_0$, and $q_0 = cm\Delta t$, where c is a specific heat capacity of the glass plate, m is the total mass of the glass plate to be heated, $\Delta t$ is a temperature difference between a charging temperature of the glass plate and a discharging temperature of the glass plate, and $K_1$ is a correction coefficient, a value range of which is $1 < K_1 \leq 1.3$.

The actuating mechanism is a control mechanism for controlling a cooling fan to run; after the glass plate is conveyed into the heating furnace, the monitoring unit monitors in real time the energy consumed by the heating element of the heating furnace, and sends the energy consumed to the control unit to compare with a set threshold $Q_2$, and when the energy consumed by the heating element of the heating furnace is greater than or equal to the threshold $Q_2$, the control unit sends an instruction to the control mechanism of the cooling fan, the control mechanism of the cooling fan controlling the cooling fan to be switched on or to be changed from an idle state to an active state.

The threshold $Q_2 = Q_1 \cdot K_2$, $Q_1 = K_1 \cdot q_0$, $q_0 = cm\Delta t$, where c is a specific heat capacity of the glass plate, m is the total mass of the glass plate to be heated, $\Delta t$ is a temperature difference between a charging temperature of the glass plate and a discharging temperature of the glass plate, $K_1$ is a correction coefficient, a value range of which is $1 > K_1 \leq 1.3$, and $K_2$ is a correction coefficient for the cooling fan to run in advance, a value range of which is $0.5 \leq K_2 \leq 1$.

The energy is electric energy consumed by the heating element of the heating furnace, and the monitoring unit is an electric energy meter, an electric energy module, or an electric energy sensor.

The energy is electric energy consumed by the heating element of the heating furnace, and the monitoring unit is a power meter, a power module, or a power sensor; instantaneous power of the heating element is monitored in real time by using the monitoring unit, and the instantaneous power is integrated over time to obtain the electric energy consumed by the heating element.

The energy is electric energy consumed by the heating element of the heating furnace, and the monitoring unit is a combination of a voltmeter and an ammeter, a combination of a voltage module and a current module, or a combination of a voltage sensor and a current sensor; an instantaneous voltage and an instantaneous current of the heating element are monitored in real time by using the monitoring unit, and a product of the instantaneous voltage and the instantaneous current is integrated over time to obtain the electric energy consumed by the heating element.

The energy is electric energy consumed by the heating furnace, and the monitoring unit is a PLC. A quantity of instantaneously opened heating elements is monitored in real time by using the PLC. Instantaneous power of the heating elements of the entire heating furnace is obtained according to rated power of a single heating element, and the instantaneous power is integrated over time to obtain the electric energy consumed by the heating elements.

The energy is gas chemical energy consumed by the heating element of the heating furnace, and the monitoring unit is a gas meter.

The threshold is manually input to the control unit through a human-machine interface or is obtained through automatic calculation by the control unit.

Beneficial Effects of the Present Disclosure

On one hand, a conventional time-based control method in the field of the prior art is replaced, after a glass plate is conveyed into a heating furnace, energy consumed by a heating element of the heating furnace is monitored in real time by using a monitoring unit, which has the following advantages: 1. A heating procedure of the glass plate can be more scientifically and precisely controlled, and therefore, a discharging moment of the glass plate can be accurately determined, insufficient heating temperature or over-sintering of the glass plate can be avoided, and the quality of finished products of tempered glass can be improved; and 2. A moment at which a cooling fan is switched on or changes from an idle state to an active state can be more scientifically and precisely controlled, and therefore, an unqualified stress caused by an insufficient wind pressure after the glass plate enters a tempering stage can be avoided, and a waste of energy caused by the cooling fan being switched on or changing from an idle state to an active state too early can be avoided.

On the other hand, a control procedure of a glass plate tempering process no longer relies on experience and quality of an operator, which not only reduces labor costs, but also makes an equipment more intelligent, and more simple and convenient to operate, thereby facilitating the stability of the production process and product quality.

DETAILED DESCRIPTION

The following describes embodiments of the present disclosure in detail with reference to the drawings, and detailed implementations are as follows:

Embodiment 1

Figure 1:
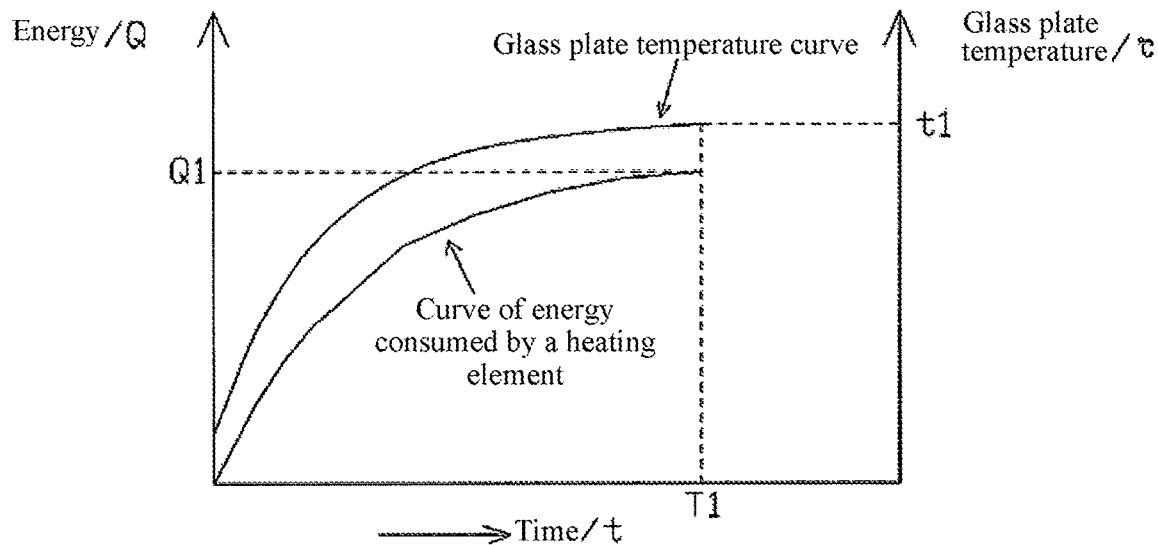
FIG. 1 is a variation curve chart of energy consumed by a heating element when a glass plate discharge action is controlled according to Embodiment 1 of the present disclosure.

As shown in FIG. 1, the actuating mechanism is a driving mechanism for controlling a glass plate discharge action, and a control procedure of a heating control method of the present disclosure is as follows:

Firstly, the total mass of the glass plate to be heated is obtained, and energy $q_0$ needed for the glass plate to be heated from a charging temperature to a discharging temperature is calculated according to a formula $q_0 = cm\Delta t$, where c is a specific heat capacity of the glass plate, m is the total mass of the glass plate to be heated, and $\Delta t$ is a temperature difference between the charging temperature of the glass plate and the discharging temperature of the glass plate. The discharging temperature is a temperature that is set in a glass plate tempering process when the glass plate is heated to be soft in a heating furnace, meeting a discharging condition. Usually, a value range of the discharging temperature is 650° C. to 700° C., and the discharging temperature may be set according to types (for example, low emissivity coating glass and clear class), and the thickness of the glass plate to be heated. The total mass of the glass plate may be directly measured by using an available weighing instrument, and may also be obtained through calculation according to the breadth size, the thickness, and the density of the glass plate to be heated.

Secondly, a threshold $Q_1$ meeting the discharging condition of the glass plate is calculated according to a formula $Q_1 = K_1 \cdot q_0$, where $K_1$ is a correction coefficient, a value range of which is $1 < K_1 \leq 1.3$. It should be noted that a value of $K_1$ is related to impact factors such as heat-preservation performance of the heating furnace, an ambient temperature, and utilization of electric energy or gas. In an actual production procedure, a $K_1$ value database related to the foregoing impact factors may be established for the heating furnace of a certain specification, so that $K_1$ can be automatically retrieved from the database. In this embodiment, $K_1 = 1.2$, and after the threshold $Q_1$ is calculated, an operator inputs the threshold $Q_1$ to a control unit through a human-machine interface. Certainly, the control unit may automatically obtain the total mass of the glass plate, and retrieve $K_1$ from the database, to automatically calculate the threshold $Q_1$.

After being conveyed into the heating furnace at a low temperature, the glass plate begins absorbing heat, and energy consumed by a heating element increases rapidly. At this time, a monitoring unit monitors in real time the energy consumed by the heating element of the heating furnace, and compares the energy consumed with the set threshold $Q_1$. When the energy consumed by the heating element of the heating furnace is greater than or equal to the threshold $Q_1$, the control unit sends an instruction to the driving mechanism to directly discharge the glass plate from the heating furnace or to discharge the glass plate from the heating furnace after a delay.

In this embodiment, when an electric heating furnace is used, the energy is electric energy consumed by the heating element of the heating furnace, and the monitoring unit is an electric energy meter, an electric energy module, or an electric energy sensor that may directly read the electric energy consumed by the heating element. Certainly, the monitoring unit in this embodiment may be a power meter, a power module, or a power sensor; instantaneous power of the heating element is monitored in real time by using the monitoring unit, and the instantaneous power is integrated over time to obtain the electric energy consumed by the heating element. In addition, the monitoring unit in this embodiment may alternatively be a combination of a voltmeter and an ammeter, a combination of a voltage module and a current module, or a combination of a voltage sensor and a current sensor; an instantaneous voltage and an instantaneous current of the heating element are monitored in real time by using the monitoring unit, and a product of the instantaneous voltage and the instantaneous current is integrated over time to obtain the electric energy consumed by the heating element.

In this embodiment, when a gas heating furnace is used, the energy is gas chemical energy consumed by the heating element of the heating furnace, and therefore, the monitoring unit is a gas meter; and a product of a heat value of the gas and a volume of the gas consumed is the energy consumed by the heating element.

Embodiment 2

Figure 2:
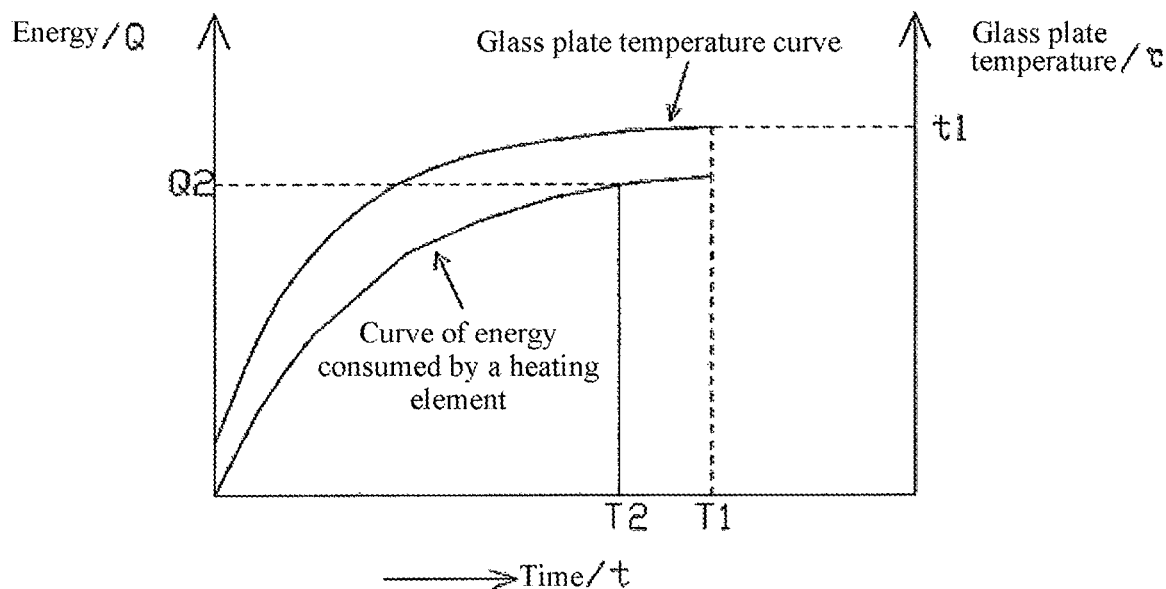
FIG. 2 is a variation curve chart of energy consumed by a heating element when a cooling fan is controlled to run according to Embodiment 2 of the present disclosure.

As shown in FIG. 2, the actuating mechanism is a control mechanism of a cooling fan, and a control procedure of a control method of the present disclosure is as follows: Firstly, the total mass of the glass plate to be heated is obtained, and energy $q_0$ needed for the glass plate to be heated from a charging temperature to a discharging temperature is calculated according to a formula $q_0=cm\Delta t$, where c is a specific heat capacity of the glass plate, m is the total mass of the glass plate to be heated, and $\Delta t$ is a temperature difference between the charging temperature of the glass plate and the discharging temperature of the glass plate. The discharging temperature is a temperature that is set in a glass plate tempering process when the glass plate is heated to be soft in a heating furnace, meeting a discharging condition. Usually, a value range of the discharging temperature is 600° C. to 700° C., and the discharging temperature may be set according to types (for example, low emissivity coating glass and clear class), and the thickness of the glass plate to be heated. The total mass of the glass plate may be directly measured by using an available weighing instrument, and may also be obtained through calculation according to the breadth size, the thickness, and the density of the glass plate to be heated.

Secondly, a threshold $Q_2$ meeting a running condition of the cooling fan is calculated according to formulas $Q_2=Q_1 \cdot K_2$, and $Q_1=K_1 \cdot q_0$, where $K_1$ is a correction coefficient, a value range of which is $1<K_1 \leq 1.3$. It should be noted about its value range that a value of $K_1$ is related to impact factors such as heat-preservation performance of the heating furnace, an ambient temperature, and utilization of electric energy or gas. In an actual production procedure, a $K_1$ value database related to the foregoing impact factors may be established for the heating furnace of a certain specification, so that $K_1$ can be automatically retrieved from the database. $K_2$ is a correction coefficient for the cooling fan to run in advance, a value range of which is $0.5 \leq K_2 \leq 1$. In this embodiment, $K_1=1.2$, $K_2=0.8$, and after the threshold $Q_2$ is calculated, an operator inputs the threshold $Q_2$ to a control unit through a human-machine interface. Certainly, the control unit may automatically obtain the total mass of the glass plate, and retrieve $K_1$ from the database, to automatically calculate the threshold $Q_2$.

After being conveyed into the heating furnace at a low temperature, the glass plate begins to absorb heat, and energy consumed by a heating element increases rapidly. At this time, a monitoring unit monitors in real time the energy consumed by the heating element of the heating furnace, and compares the energy consumed with the set threshold $Q_2$. When the energy consumed by the heating element of the heating furnace is greater than or equal to the threshold $Q_2$, the control unit sends an instruction to the control mechanism of the cooling fan, the control mechanism of the cooling fan controlling the cooling fan to be switched on or to be changed from an idle state to an active state.

The heating element of the heating furnace in this embodiment may be an electric heating element or a gas heating element. The monitoring unit and a calculation procedure of the energy consumed by the heating element are the same as those in Embodiment 1. Details are not described herein again.

The technical solutions and implementations provided in the present disclosure are not intended for limiting, and solutions that are equivalent to or have same effects of the technical solutions and implementations provided in the present disclosure fall within the protection scope of the present disclosure.

What is claimed is:

1. An actuating mechanism control method for a glass plate tempering process, comprising:
conveying a glass plate into a heating furnace;
monitoring in real time energy consumed by a heating element of the heating furnace by a monitoring unit;
sending the energy consumed to a control unit to compare with a set threshold, wherein the set threshold is at least one of a set threshold Q1 and a set threshold Q2; and
upon determining the energy consumed by the heating element of the heating furnace being greater than or equal to the set threshold, sending an instruction to an actuating mechanism by the control unit to control actions of the actuating mechanism, the actuating mechanism being a driving mechanism for controlling a glass plate discharge action or a control mechanism for controlling a cooling fan to run;
wherein:
when the actuating mechanism is the driving mechanism for controlling a glass plate discharge action, after the glass plate being conveyed into the heating furnace, the monitoring unit monitors in real-time the energy consumed by the heating element of the heating furnace, and sends the energy consumed to the control unit to compare with the set threshold Q1,
upon determining the energy consumed by the heating element of the heating furnace being greater than or equal to the set threshold Q1, the control unit sends the instruction to the driving mechanism to directly discharge the glass plate from the heating furnace or to discharge the glass plate from the heating furnace after a delay, wherein the set threshold Q1=K1·q0, q0=cm$\Delta$t, c is a specific heat capacity of the glass plate, m is a total mass of the glass plate to be heated, $\Delta$t is a temperature difference between a charging temperature of the glass plate and a discharging temperature of the glass plate, and K1 is a correction coefficient, a value range of which is 1<K1$\leq$1.3; and wherein:
when the actuating mechanism is the control mechanism for controlling the cooling fan to run, after the glass plate being conveyed into the heating furnace, the monitoring unit monitors in real-time the energy consumed by the heating element of the heating furnace, and sends the energy consumed to the control unit to compare with the set threshold Q2; and upon determining the energy consumed by the heating element of the heating furnace being greater than or equal to the set threshold Q2, the control unit sends the instruction to the control mechanism of the cooling fan, and the control mechanism of the cooling fan controls the cooling fan to be switched on or to be changed from an idle state to an active state, wherein the set threshold $Q2=Q1 \cdot K2$, $Q1=K1 \cdot q0$, $q0=cm\Delta t$, c is the specific heat capacity of the glass plate, m is the total mass of the glass plate to be heated, $\Delta t$ is the temperature difference between the charging temperature of the glass plate and the discharging temperature of the glass plate, K1 is the correction coefficient, the value range of which is $1<K1\leq1.3$, and K2 is a correction coefficient for the cooling fan to run in advance, a value range of which is $0.5\leq K2\leq1$.

2. The actuating mechanism control method for a glass plate tempering process according to claim 1, wherein the energy is electric energy consumed by the heating element of the heating furnace, and the monitoring unit is an electric energy meter, an electric energy module, or an electric energy sensor.

3. The actuating mechanism control method for a glass plate tempering process according to claim 1, wherein the energy is electric energy consumed by the heating element of the heating furnace, and the monitoring unit is a power meter, a power module, or a power sensor; and wherein instantaneous power of the heating element is monitored in real time by using the monitoring unit, and the instantaneous power is integrated over time to obtain the electric energy consumed by the heating element.

4. The actuating mechanism control method for a glass plate tempering process according to claim 1, wherein the energy is electric energy consumed by the heating element of the heating furnace, and the monitoring unit is a combination of a voltmeter and an ammeter, a combination of a voltage module and a current module, or a combination of a voltage sensor and a current sensor; and wherein an instantaneous voltage and an instantaneous current of the heating element are monitored in real time by using the monitoring unit, and a product of the instantaneous voltage and the instantaneous current is integrated over time to obtain the electric energy consumed by the heating element.

5. The actuating mechanism control method for a glass plate tempering process according to claim 1, wherein the energy is electric energy consumed by the heating furnace, and the monitoring unit is a programmable logic controller ("PLC"), a quantity of instantaneously opened heating elements is monitored in real time by using the PLC, and wherein instantaneous power of the heating elements of the entire heating furnace is obtained according to rated power of a single heating element, and the instantaneous power is integrated over time to obtain the electric energy consumed by the heating elements.

6. The actuating mechanism control method for a glass plate tempering process according to claim 1, wherein the energy is gas chemical energy consumed by the heating element of the heating furnace, and the monitoring unit is a gas meter.

7. The actuating mechanism control method for a glass plate tempering process according to claim 1, wherein the set threshold is manually input to the control unit through a human-machine interface or is obtained through automatic calculation by the control unit.

* * * * *